UNITED STATES PATENT OFFICE.

ROCKY CANADA GANGEWERE, OF SOUTH BETHLEHEM, PENNSYLVANIA.

PROCESS FOR PREPARING PAVING OR BUILDING BLOCKS.

No. 897,080.      Specification of Letters Patent.      Patented Aug. 25, 1908.

Application filed July 17, 1907. Serial No. 384,253.

*To all whom it may concern:*

Be it known that I, ROCKY CANADA GANGEWERE, a citizen of the United States, residing at South Bethlehem, in the county of Northampton and State of Pennsylvania, have invented a new and useful Process for Preparing Paving or Building Blocks, of which the following is a specification.

This invention relates to a brick for paving, building or other purposes and has for its object the manufacture of building bricks from furnace slag mixed with more or less cement and preferably by a dry process, the bricks being formed under heavy pressure. In forming my bricks I mix pulverized slag with the desired portion of cement and then subject the mixture to heavy pressure, preferably that of a hydraulic press thus molding the bricks by a dry process forming a very hard, durable and fire-proof brick adapted for any purpose for which such a brick will be suitable. By this means a brick is also produced which is capable of withstanding considerable pressure without being crushed or broken. The amount of cement employed can vary according to the use to which the brick is to be placed but in usual practice I will use about 12 parts of pulverized slag to one of cement. It will also be understood that Portland cement is used and that if a colored brick is desired, any suitable coloring matter may be added.

In preparing the composition of granulated furnace slag and Portland cement or other cement, I employ new or fresh slag. The slag as it is leaving the furnace is granulated by having the same deposited into metal cars to which the proper amount of water is added, said water being added to the slag while in the cars, and the same will granulate and is then carried by the cars to a drying pan into which it is dumped from the cars, and the cement mixed therewith while the slag is being pulverized and without the addition of more water. The pulverized slag and cement is then run through a series of screens of from one hundred to two hundred mesh to the square inch after which the mixture is passed through the second mixing process to secure uniform disposition of the cement and slag and is then passed to a hydraulic or other press and formed into blocks, bricks or other building or paving material. After the blocks, bricks or slabs have left the presses they are moistened either by dipping into water or by sprinkling in order to increase the durability of the block.

What I claim is:—

A process of making building or paving blocks consisting in conveying fresh slag directly from a blast furnace to a pulverizer, applying water to said slag between the furnace and the pulverizer thereby granulating the slag, mixing Portland cement with said granulated slag, during pulverization of the slag, conveying the pulverized mixture to suitable presses and pressing the same into blocks, and moistening said blocks after they come from the press.

ROCKY CANADA GANGEWERE.

Attest:
A. L. McLEOD,
W. D. E. ALLEN.